US012614971B2

(12) United States Patent
Yang et al.

(10) Patent No.: US 12,614,971 B2
(45) Date of Patent: Apr. 28, 2026

(54) SWITCHING CONVERTER HAVING AUDIBLE NOISE SUPPRESSION AND CONVERSION CONTROL CIRCUIT AND METHOD THEREOF

(71) Applicant: Richtek Technology Corporation, Zhubei City (TW)

(72) Inventors: Tsung-Jung Yang, Hsinchu (TW); Yi-Ju Lee, Hsinchu (TW); Ping-Ching Huang, Taipei (TW)

(73) Assignee: RICHTEK TECHNOLOGY CORPORATION, Zhubei City (TW)

( * ) Notice: Subject to any disclaimer, the term of this patent is extended or adjusted under 35 U.S.C. 154(b) by 224 days.

(21) Appl. No.: 18/500,072

(22) Filed: Nov. 1, 2023

(65) Prior Publication Data

US 2024/0186887 A1 Jun. 6, 2024

(30) Foreign Application Priority Data

Dec. 6, 2022 (TW) .................................. 111146771

(51) Int. Cl.
H02M 3/158 (2006.01)
H02M 1/08 (2006.01)
H02M 1/15 (2006.01)

(52) U.S. Cl.
CPC .............. H02M 1/15 (2013.01); H02M 1/08 (2013.01); H02M 3/158 (2013.01)

(58) Field of Classification Search
CPC .. H02M 3/158; H02M 3/1582; H02M 3/1584;

H02M 3/1586; H02M 3/155; H02M 3/1552; H02M 3/1555; H02M 3/1557; H02M 3/156; H02M 3/1563; H02M 1/15; H02M 1/14; H02M 1/08; H02M 1/082; H02M 1/083; H02M 1/088; H02M 1/06
See application file for complete search history.

(56) References Cited

U.S. PATENT DOCUMENTS

| | | | | |
|---|---|---|---|---|
| 2004/0183511 A1* | 9/2004 | Dening | .................... | H03K 7/08 |
| | | | | 323/282 |
| 2012/0019225 A1* | 1/2012 | Tsai | ....................... | H02M 3/156 |
| | | | | 323/284 |
| 2016/0352227 A1* | 12/2016 | Houston | ................... | G06F 1/26 |
| 2017/0187282 A1* | 6/2017 | Wang | ...................... | H02M 1/12 |
| 2023/0013594 A1* | 1/2023 | Kawano | .............. | H02M 1/0025 |

* cited by examiner

*Primary Examiner* — Nguyen Tran
(74) *Attorney, Agent, or Firm* — Tung & Associates

(57) ABSTRACT

A switching converter includes: a power stage circuit including at least one switch to switch an inductor to convert an input power to an output power; a modulation circuit executing a pulse width modulation according to a feedback signal related to the output power and a reference signal to generate a modulation trigger signal; a time calculation circuit generating a pulse width modulation (PWM) signal according to the modulation trigger signal to control the at least one switch and computing an ON-time or an OFF-time of the PWM signal; and a time adjustment circuit generating a time adjustment signal according to a first clock signal related to the PWM signal, wherein the time adjustment signal adjusts the ON-time or OFF-time in a random or a pseudo-random fashion, so as to suppress a noise resulting from a switching frequency of the PWM signal.

30 Claims, 16 Drawing Sheets

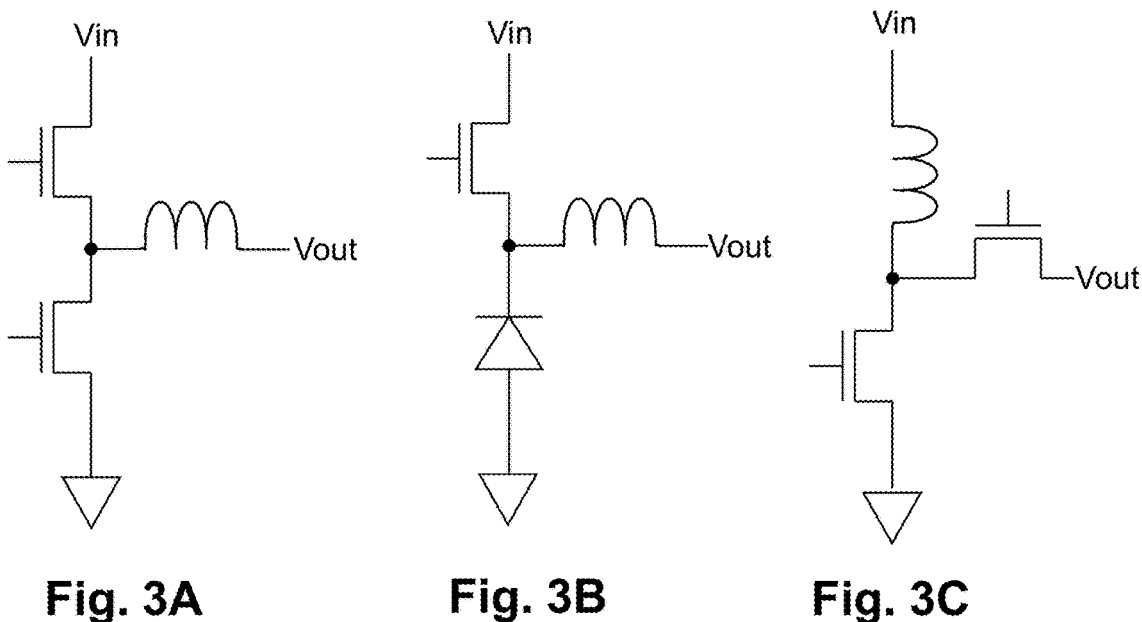
Fig. 3A          Fig. 3B          Fig. 3C
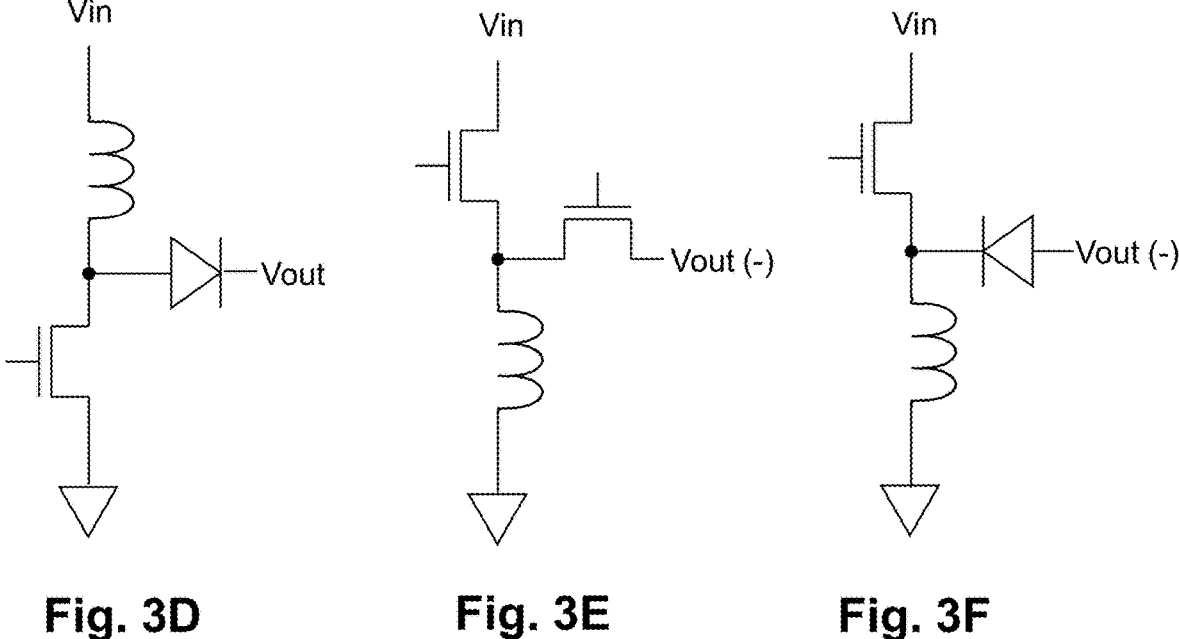
Fig. 3D          Fig. 3E          Fig. 3F

Ckwm $\left\{\begin{array}{l} \text{Str} \\ \text{or} \\ \text{Cpo1} \end{array}\right.$

SWITCHING CONVERTER HAVING AUDIBLE NOISE SUPPRESSION AND CONVERSION CONTROL CIRCUIT AND METHOD THEREOF

CROSS REFERENCE

The present invention claims priority to TW 111146771 filed on Dec. 6, 2022.

BACKGROUND OF THE INVENTION

Field of Invention

The present invention relates to a switching converter; particularly, it relates to a constant ON-time switching converter having audible noise suppression function. The present invention also relates to a conversion control circuit and a control method for controlling the switching converter.

Description of Related Art

Please refer to FIG. 1A, which shows a schematic diagram of a conventional switching converter (i.e., a conventional switching converter 1000). In FIG. 1A, the conventional switching converter 1000 switches an inductor Li via switches SWH and SWL, to convert an input power Vin to an output power Vout, wherein the output power Vout is supplied to a load ILD. An amplifier 101 generates an error amplification signal EAO1 according to a feedback signal VF related to the output power Vout and a reference signal VRE. A comparator 102 compares a ramp signal VRA1 with the error amplification signal EAO1, to generate a comparison signal SCP. An ON-time calculation circuit 103 generates a pulse width modulation (PWM) signal PWM according to the comparison signal SCP. A driver circuit 104 generates a control signal SH and a control signal SL according to the PWM signal PWM, wherein the control signal SH and the control signal SL serve to control conduction states of the switch SWH and the switch SWL, respectively.

Under light load condition, because the conventional switching converter 1000 operates in a discontinuous conduction mode (DCM), the switching frequency of the PWM signal PWM is relatively lower. In a case when the switching frequency of the PWM signal PWM falls within an audible bandwidth (e.g., 20 Hz~20 kHz), an unwanted audible noise will be generated. Please refer to FIG. 1B, which shows a frequency versus power relationship diagram of the prior art shown in FIG. 1A. To avoid the unwanted audible noise, the conventional switching converter 1000 clamps the switching frequency of the PWM signal PWM or omits certain pulses of the PWM signal PWM. However, as shown in FIG. 1B, these approaches result in relatively higher switching frequency, whereby the power loss is relatively greater and switching efficiency is relatively lower.

As compared to the prior art in FIG. 1A and FIG. 1B, the present invention is advantageous in that: the switching converter of the present invention can adjust the ON-time or OFF-time of the PWM signal in a random or a pseudo-random fashion, so as to suppress unwanted audible noise. In addition, the adjustment approach of the present invention has merits of low power loss and high conversion efficiency.

SUMMARY OF THE INVENTION

From one perspective, the present invention provides a switching converter, which is configured to operably convert an input power to an output power; the switching converter comprising: a power stage circuit including at least one switch, wherein the power stage circuit is configured to operably switch an inductor, to generate the output power; a modulation circuit, which is configured to operably execute a pulse width modulation according to a feedback signal related to the output power and a reference signal, to generate a modulation trigger signal; a time calculation circuit, which is configured to operably generate a pulse width modulation (PWM) signal according to the modulation trigger signal, to control the at least one switch, and which is configured to operably calculate an ON-time or an OFF-time of the PWM signal; and a time adjustment circuit, which is configured to operably generate a time adjustment signal according to a first clock signal related to the PWM signal, wherein the time adjustment signal is configured to operably adjust the ON-time or the OFF-time in a random or a pseudo-random fashion, so as to suppress a noise resulting from a switching frequency of the PWM signal.

In one embodiment, in a case when the switching frequency is lower than a predetermined frequency threshold, the time adjustment circuit is configured to operably adjust the ON-time or the OFF-time, to suppress the noise resulting from operating below than the predetermined frequency threshold.

In one embodiment, the predetermined frequency threshold is smaller than or equal to 30 kHz and greater than or equal to 20 kHz, wherein the noise to be suppressed is an audible noise.

In one embodiment, the modulation trigger signal is configured to operably trigger the PWM signal to turn to a first state. When the PWM signal is in the first state, the time calculation circuit is configured to operably execute an integration operation of a first current source via an integration capacitor, to generate a first integration voltage, and the time calculation circuit is configured to operably compare the first integration voltage with a reference voltage, to generate a first comparison signal, wherein when the first comparison signal indicates that the first integration voltage exceeds the reference voltage, the PWM signal turns to a second state.

In one embodiment, the time adjustment signal is configured to operably adjust the first current source, a capacitance of the integration capacitor or a voltage level of the reference voltage in a random or a pseudo-random fashion, so as to adjust the ON-time or the OFF-time.

In one embodiment, the first current source is proportional to the input power, whereas, the reference voltage is proportional to the output power, so that when the switching converter operates in a continuous conduction mode (CCM), the switching frequency is kept as a constant.

In one embodiment, the time adjustment circuit includes: a frequency detector, which is configured to operably generate a second comparison signal according to the first clock signal, wherein the second comparison signal indicates whether the switching frequency is lower than the predetermined frequency threshold during each switching period, wherein the switching period is a reciprocal of the switching frequency; and a random number generator, which is configured to operably generate the time adjustment signal having a random characteristic or a pseudo-random characteristic according to the second comparison signal, to correspondingly adjust the ON-time or the OFF-time.

In one embodiment, the random number generator includes a linear feedback shift register (LFSR), wherein a pulse of the second comparison signal triggers a shifting operation of the LFSR, to generate the time adjustment signal having the random characteristic or the pseudo-random characteristic.

In one embodiment, the random number generator includes: a state circuit, which is configured to operably generate an enable signal according to the second comparison signal and the modulation trigger signal; and a LFSR, which is configured to operably generate the time adjustment signal having the random characteristic or the pseudo-random characteristic according to the enable signal and a second clock signal, wherein the second clock signal is correlated with the modulation trigger signal, the first comparison signal, the PWM signal or the second comparison signal.

In one embodiment, the frequency detector is configured to operably execute an integration operation of a second current source according to a control by the first clock signal, to generate a second integration voltage, wherein when the second integration voltage exceeds a voltage threshold, the second comparison signal indicates that the switching frequency is lower than the predetermined frequency threshold.

In one embodiment, the switching converter operates in a discontinuous conduction mode (DCM).

In one embodiment, the modulation circuit includes: an error amplifier, which is configured to operably generate an error amplification signal according to the feedback signal and the reference signal; and a PWM comparator, which is configured to operably compare a ramp signal with the error amplification signal, to generate the modulation trigger signal; wherein the ramp signal is generated according to an output current of the output power.

From another perspective, the present invention provides a conversion control circuit for use in a switching converter, wherein the switching converter includes at least one switch, which is configured to operably switch an inductor, to convert an input power to an output power; the conversion control circuit comprising: a modulation circuit, which is configured to operably execute a pulse width modulation according to a feedback signal related to the output power and a reference signal, to generate a modulation trigger signal; a time calculation circuit, which is configured to operably generate a pulse width modulation (PWM) signal according to the modulation trigger signal, to control the at least one switch, and which is configured to operably calculate an ON-time or an OFF-time of the PWM signal; and a time adjustment circuit, which is configured to operably generate a time adjustment signal according to a first clock signal related to the PWM signal, wherein the time adjustment signal is configured to operably adjust the ON-time or the OFF-time in a random or a pseudo-random fashion, so as to suppress a noise resulting from a switching frequency of the PWM signal.

From yet another perspective, the present invention provides a control method configured to control a switching converter, wherein the switching converter includes at least one switch, which is configured to operably switch an inductor, to convert an input power to an output power; the control method comprising following steps: executing a pulse width modulation according to a feedback signal related to the output power and a reference signal, to generate a modulation trigger signal; generating a pulse width modulation (PWM) signal according to the modulation trigger signal, to control the at least one switch, and calculating an ON-time or an OFF-time of the PWM signal; and generating a time adjustment signal according to a first clock signal related to the PWM signal, wherein the time adjustment signal is configured to operably adjust the ON-time or OFF-time in a random or a pseudo-random fashion, so as to suppress a noise resulting from a switching frequency of the PWM signal.

The objectives, technical details, features, and effects of the present invention will be better understood with regard to the detailed description of the embodiments below, with reference to the attached drawings.

BRIEF DESCRIPTION OF THE DRAWINGS

FIG. 3A to FIG. 3L show schematic diagrams of a power stage circuit in a switching converter according to several embodiments of the present invention.

DESCRIPTION OF THE PREFERRED
EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
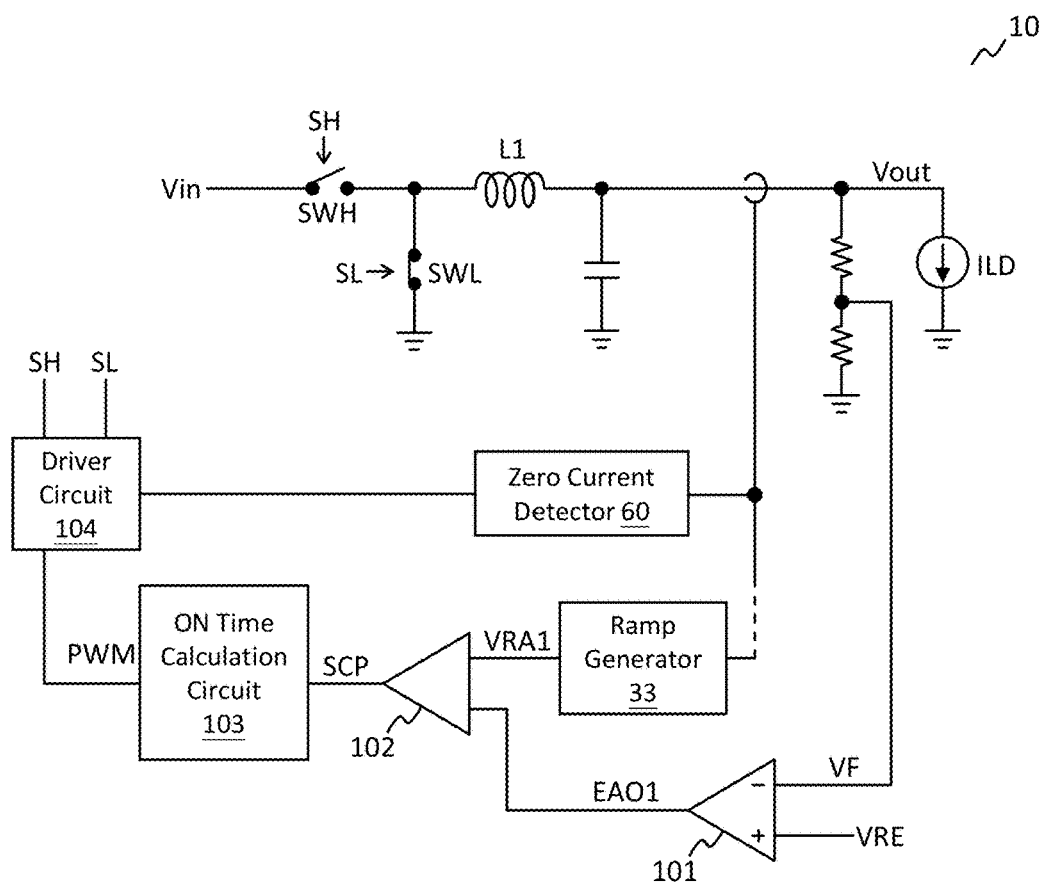
FIG. 1A shows a schematic diagram of a conventional switching converter.
Figure 1B:
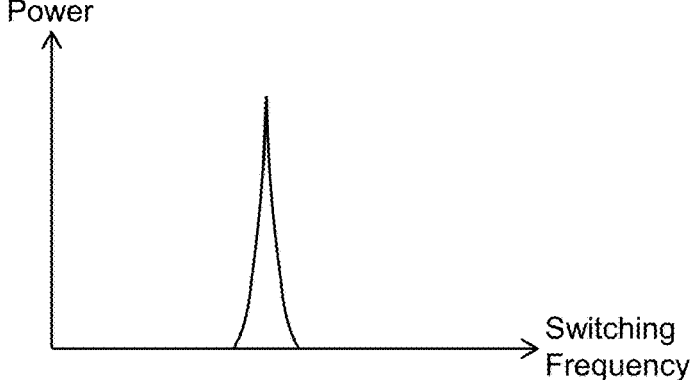
FIG. 1B shows a frequency versus power relationship diagram of the prior art shown in FIG. 1A.
Figure 2:
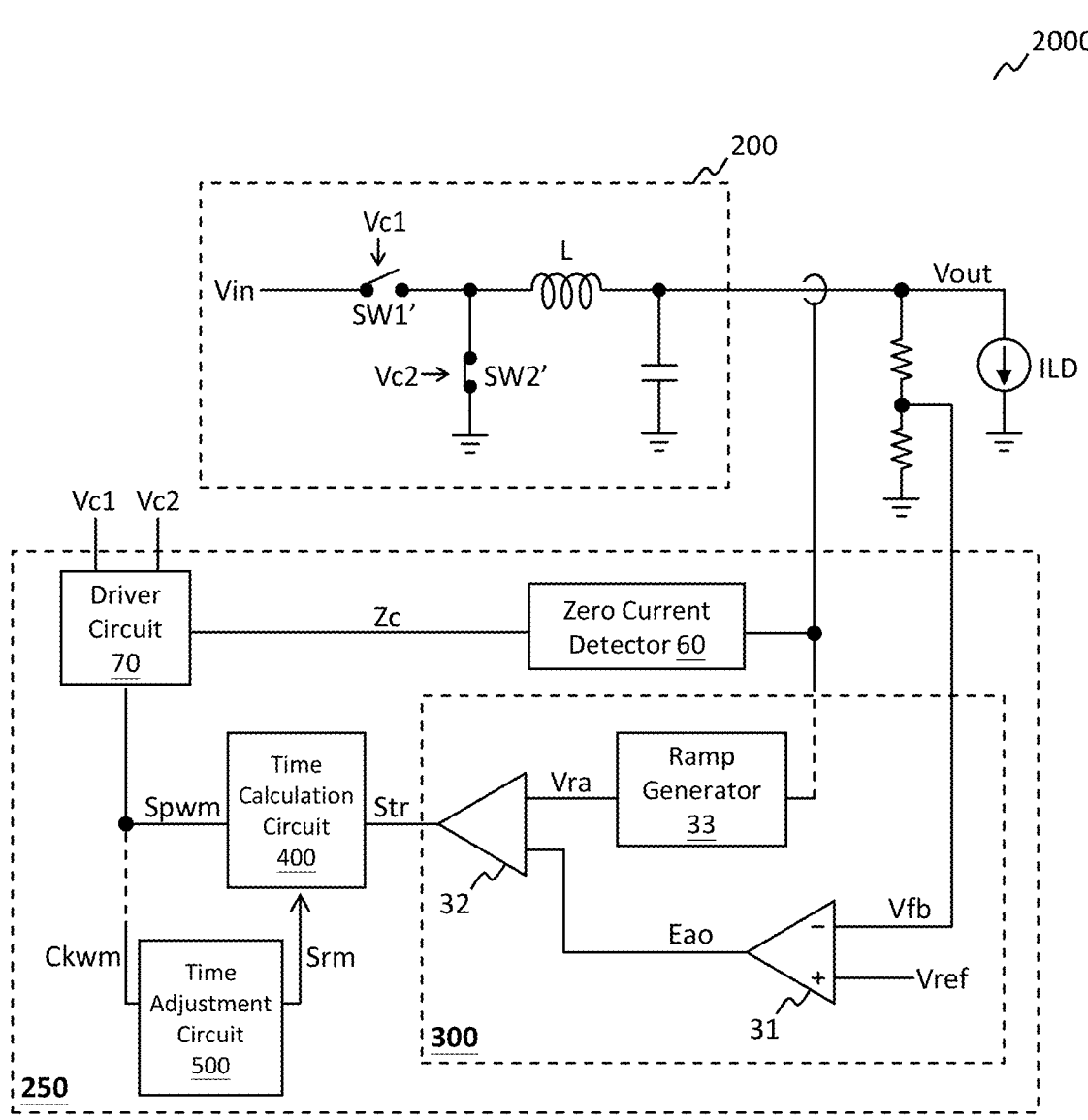
FIG. 2 shows a schematic block diagram of a switching converter according to an embodiment of the present invention.
Figure 3G:
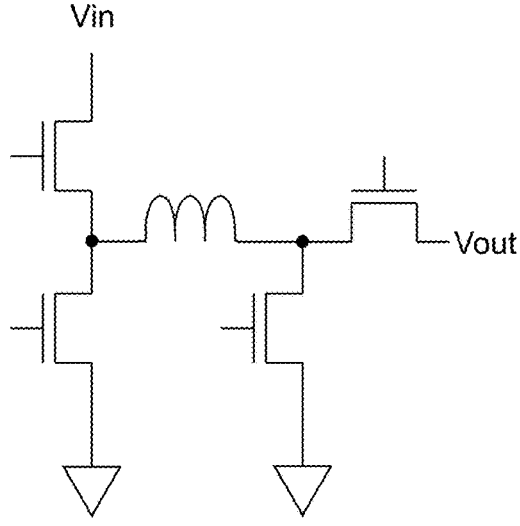
Figure 3H:
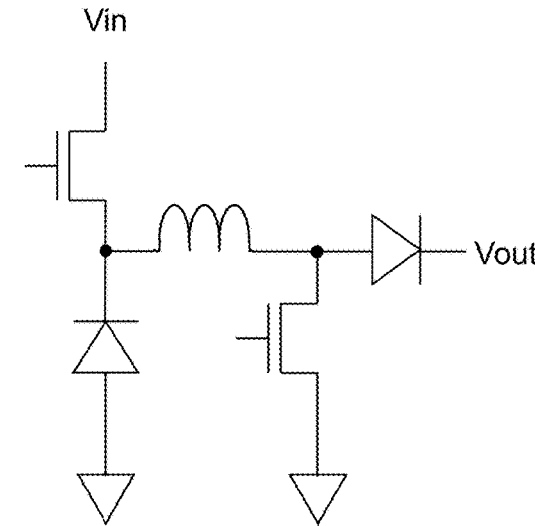
Figure 3I:
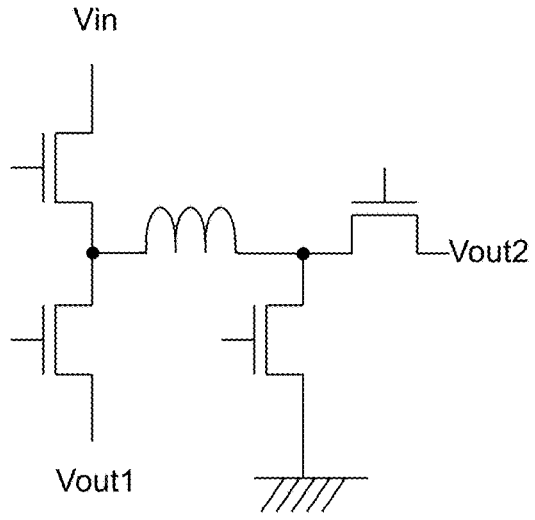
Figure 3J:
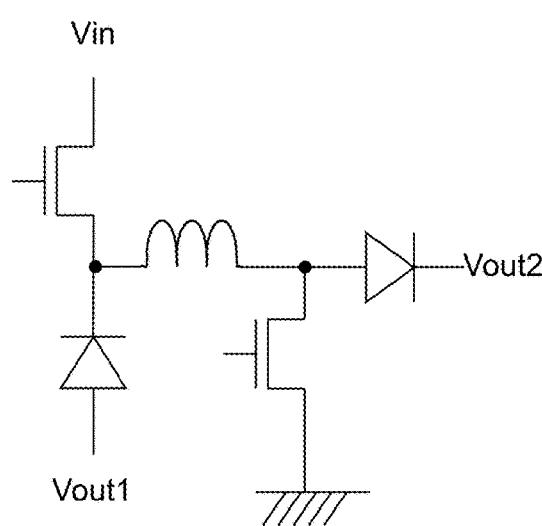
Figure 3K:
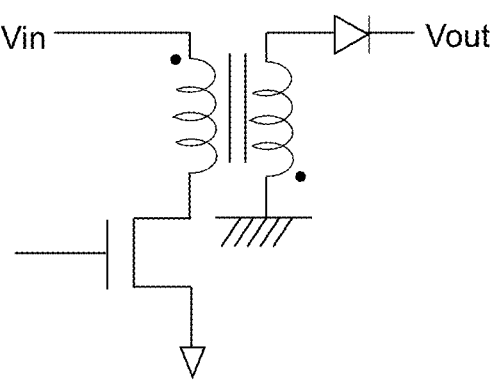
Figure 3L:
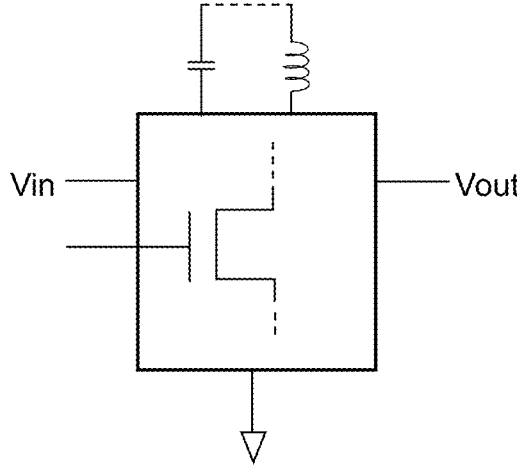

Please refer to FIG. 2, which shows a schematic block diagram of a switching converter according to an embodiment of the present invention. In one embodiment, the switching converter 2000 comprises: a power stage circuit 200 and a conversion control circuit 250. The power stage circuit 200 is configured to operably convert an input power Vin to an output power Vout, wherein the output power Vout is supplied to a load ILD. In one embodiment, the conversion control circuit 250 includes: a modulation circuit 300, a time calculation circuit 400, a time adjustment circuit 500, a zero current detector 60 and a driver circuit 70. In one embodiment, the power stage circuit 200 includes at least one switch. For example, in this embodiment, the power stage circuit 200 includes a switch SW1' and a switch SW2', which are configured to operably switch an inductor L, to generate the output power Vout. The modulation circuit 300 includes: an error amplifier 31, a pulse width modulation (PWM) comparator 32 and a ramp generator 33. The error amplifier 32 is configured to operably generate an error amplification signal Eao according to a feedback signal Vfb related to the output power Vout and a reference signal Vref. The ramp generator 33 is configured to operably generate a ramp signal Vra according to an output current of the output power Vout. The PWM comparator 32 is configured to operably compare the ramp signal Vra with the error amplification signal Eao, to generate a modulation trigger signal Str.

In one embodiment, the time calculation circuit 400 is configured to operably generate a pulse width modulation (PWM) signal Spwm according to the modulation trigger signal Str. The driver circuit 70 is configured to operably generate control signals Vc1 and Vc2 according to the PWM signal Spwm and a zero current signal Zc generated by the zero current detector 60, and the control signal Vc1 and the control signal Vc2 are configured to operably control the at least one switch of the power stage circuit 200 (e.g., in this embodiment, the control signal Vc1 and the control signal Vc2 control the switch SW1' and the switch SW2', respectively). The time calculation circuit 400 is further configured to operably calculate an ON-time or an OFF-time of the PWM signal Spwm, wherein details and mechanisms as to how the time calculation circuit 400 times the ON-time or OFF-time of the PWM signal Spwm will be further explained later. In one embodiment, when the switching converter 2000 operates in a discontinuous conduction mode (DCM), the time adjustment circuit 500 is configured to operably generate a time adjustment signal Srm according to a clock signal Ckwm related to the PWM signal Spwm, wherein the time adjustment signal Srm is configured to operably adjust the ON-time or OFF-time in a random or a pseudo-random fashion, so that the PWM signal Spwm has a spread spectrum characteristic, to thereby suppress a noise resulting from the switching frequency of the PWM signal Spwm.

Please refer to FIG. 3A to FIG. 3L, which show schematic diagrams of a power stage circuit in a switching converter according to several embodiments of the present invention. In one embodiment, the power stage circuit 200 includes at least one switch and an inductor which are coupled to each other, wherein the at least one switch serves to switch the inductor, so as to convert an input power Vin to an output power Vout. As shown in FIG. 3A to FIG. 3L, the power stage circuit 200 can be, for example but not limited to, a boost converter, a buck converter, a buck-boost converter or a switched tank (STC) converter.

Figure 4:
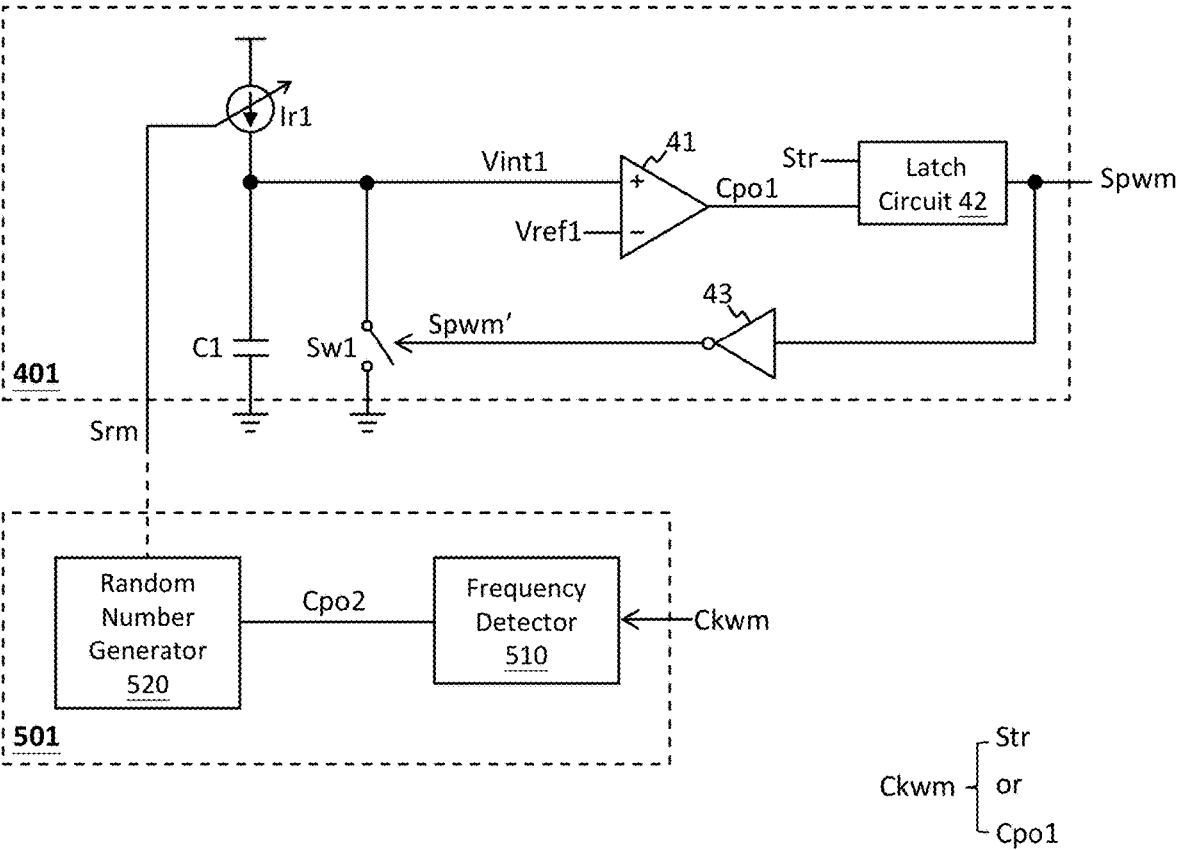
FIG. 4 shows a schematic block diagram of a time calculation circuit and a time adjustment circuit according to an embodiment of the present invention.
Figure 5:
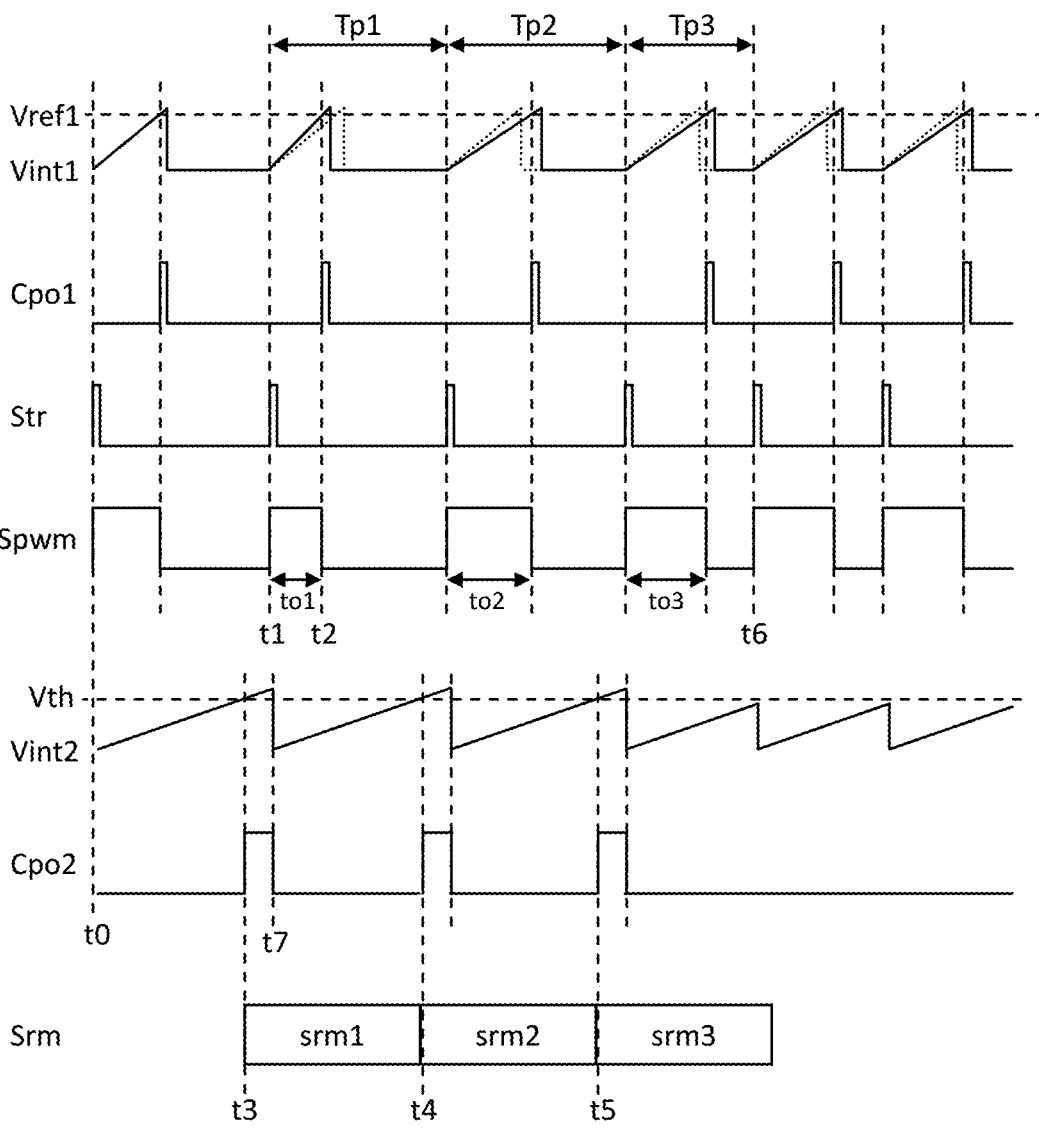
FIG. 5 illustrates a signal waveform diagram depicting the operation of the switching converter of FIG. 2 according to an embodiment of the present invention.

Please refer to FIG. 4 in conjunction with FIG. 5. FIG. 4 shows a schematic block diagram of a time calculation circuit and a time adjustment circuit according to an embodiment of the present invention. FIG. 5 illustrates a signal waveform diagram depicting the operation of the switching converter of FIG. 2 according to an embodiment of the present invention. In one embodiment, the time calculation circuit 401 of FIG. 4 includes: a comparator 41, a latch circuit 42, an inverter 43, a current source Ir1, an integration capacitor C1 and a switch Sw1. In one embodiment, the inverter 43 is configured to generate an invert signal Spwm' of the PWM signal Spwm, wherein the invert signal Spwm' serves to control a conduction state of the switch Sw1. In one embodiment, the latch circuit 42 triggers the PWM signal Spwm to turn to a first state according to the modulation trigger signal Str, whereby the invert signal Spwm' turns OFF the switch Sw1, causing the time calculation circuit 401 to start an integration operation of the current source Ir1 by the integration capacitor C1, to generate an integration voltage Vint1. As shown in FIG. 5, in this embodiment, at time point t1, the modulation trigger signal Str triggers the PWM signal Spwm to turn to the first state (e.g., high level). The integration operation of the current source Ir1 starts at time point t1, so the level of the integration voltage Vint1 starts rising at this time point.

In one embodiment, the comparator 41 is configured to operably compare the integration voltage Vint1 with a reference voltage Vref1, to generate a comparison signal Cpo1. In a case when the comparison signal Cpo1 indicates that the integration voltage Vint1 exceeds (e.g., higher than) the reference voltage Vref1, the latch circuit 42 turns the PWM signal Spwm to second state in accordance with the comparison signal Cpo1, whereby the invert signal Spwm' turns ON the switch Sw1. As shown in FIG. 5, in this embodiment, the comparison signal Cpo1 indicates that the integration voltage Vint1 exceeds the reference voltage Vref1 at time point t2. As a result, the PWM signal Spwm turns to a second state (e.g., low level), and the invert signal Spwm' turns ON the switch Sw1, so that the integration operation of the current source Ir1 stops, and the integration voltage Vint1 turns to low level.

In one embodiment, the time adjustment circuit 501 of FIG. 4 includes: a frequency detector 510 and a random number generator 520. The frequency detector 510 is configured to operably generate a comparison signal Cpo2 according to the clock signal Ckwm, wherein the comparison signal Cpo2 indicates whether the switching frequency is lower than a predetermined frequency threshold during each switching period, wherein the switching period is a reciprocal of the switching frequency. In one embodiment, the clock signal Ckwm can be the modulation trigger signal Str or the comparison signal Cpo1. As shown in FIG. 5, in one embodiment, the comparison signal Cpo2 indicates that the switching frequency is lower than the predetermined frequency threshold at time point t3. As a result, the random number generator 520 generates the time adjustment signal Srm having a random characteristic or a pseudo-random characteristic according to the comparison signal Cpo2, to adjust the ON-time or the OFF-time correspondingly, thus suppressing the noise resulting from operating below the predetermined frequency threshold. For example, the predetermined frequency threshold is greater than or equal to 20 kHz. In one embodiment, the predetermined frequency threshold is smaller than or equal to 30 kHz, wherein the noise to be suppressed is an audible noise.

In the embodiments shown in FIG. 4 and FIG. 5, the random number generator 520 is configured to operably generate a random number srm1 at time point t3, a random number srm2 at time point t4 and a random number srm3 at time point t5. The time adjustment signal Srm is configured to operably adjust the ON-time or the OFF-time via the random number srm1, the random number srm2 and the random number srm3 at the corresponding time point t3, at the corresponding time point t4 and at the corresponding time point t5, respectively, so as to suppress the noise resulting from operating below the predetermined frequency threshold. As shown in FIG. 4, in this embodiment, the time adjustment signal Srm randomly adjusts a slope of the integration voltage Vint1 by adjusting the current source Ir1, so that the time point when the comparison signal Cpo1 indicates that the integration voltage Vint1 exceeds the reference voltage Vref1 during each switching period is randomly adjusted, thus adjusting the time point when the PWM signal Spwm turns to a second state (e.g., low level); consequently, the ON-time or OFF-time has random characteristic or pseudo-random characteristic, whereby the noise resulting from operating below the predetermined frequency threshold is suppressed.

More specifically, in the embodiment shown in FIG. 5, the dotted line waveform of the integration voltage Vint1 indicates the integration voltage Vint1 which is not adjusted, whereas, the solid line waveform of the integration voltage Vint1 indicates the integration voltage Vint1 which has been adjusted in a random or a pseudo-random fashion. Through adjusting the current source Ir1 by the time adjustment signal Srm, the PWM signal Spwm has an ON-time to1, an ON-time to2 and an ON-time to3 during the period Tp1, the period Tp2 and the period Tp3, respectively. On the other hand, subsequent to time point t6, the comparison signal Cpo2 indicates that the switching frequency is not lower than the predetermined frequency threshold, so the time adjustment signal Srm is not adjusted; thus, the ON-time remains as a constant to3 until next time the comparison signal Cpo2 indicates that the switching frequency is lower than the predetermined frequency threshold. In regard to the generation of the comparison signal Cpo2, details will be explained later with reference to embodiments.

Figure 6:
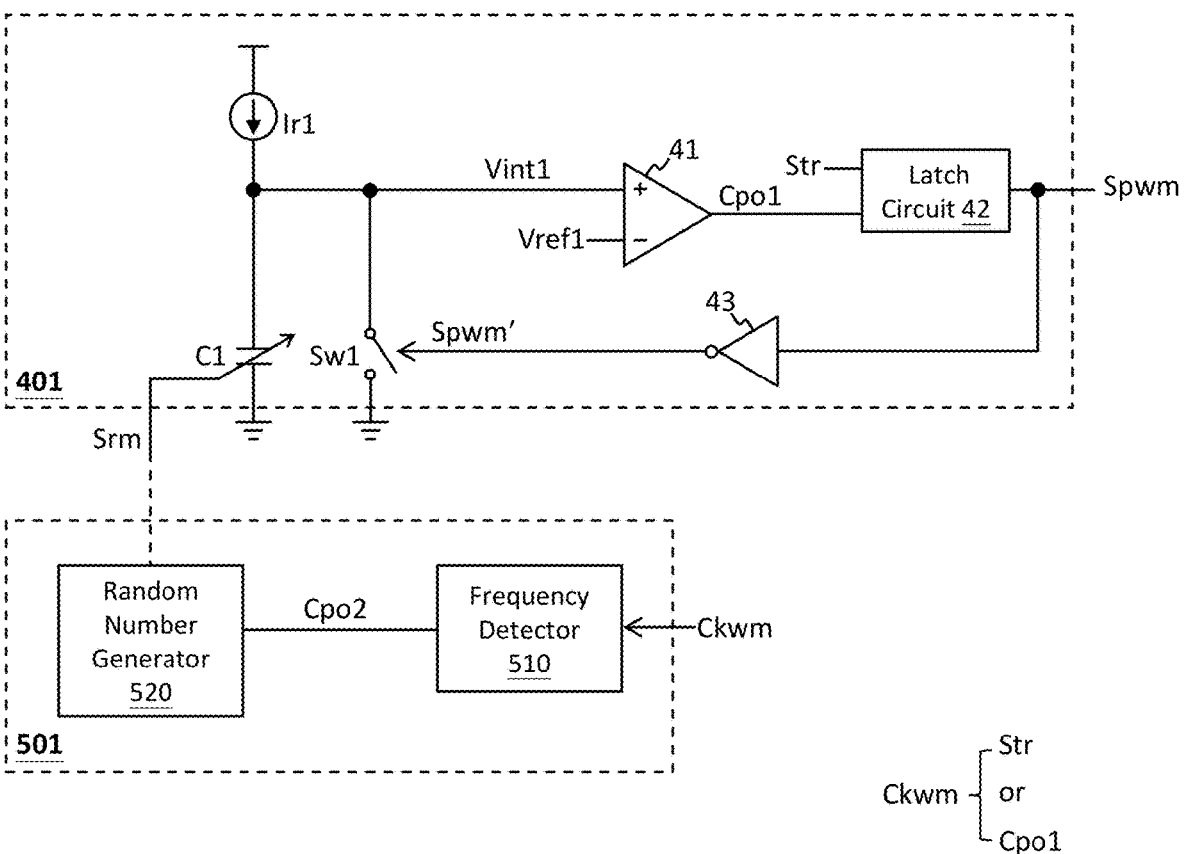
FIG. 6 shows a schematic block diagram of a time calculation circuit and a time adjustment circuit in a switching converter according to an embodiment of the present invention.
Figure 7:
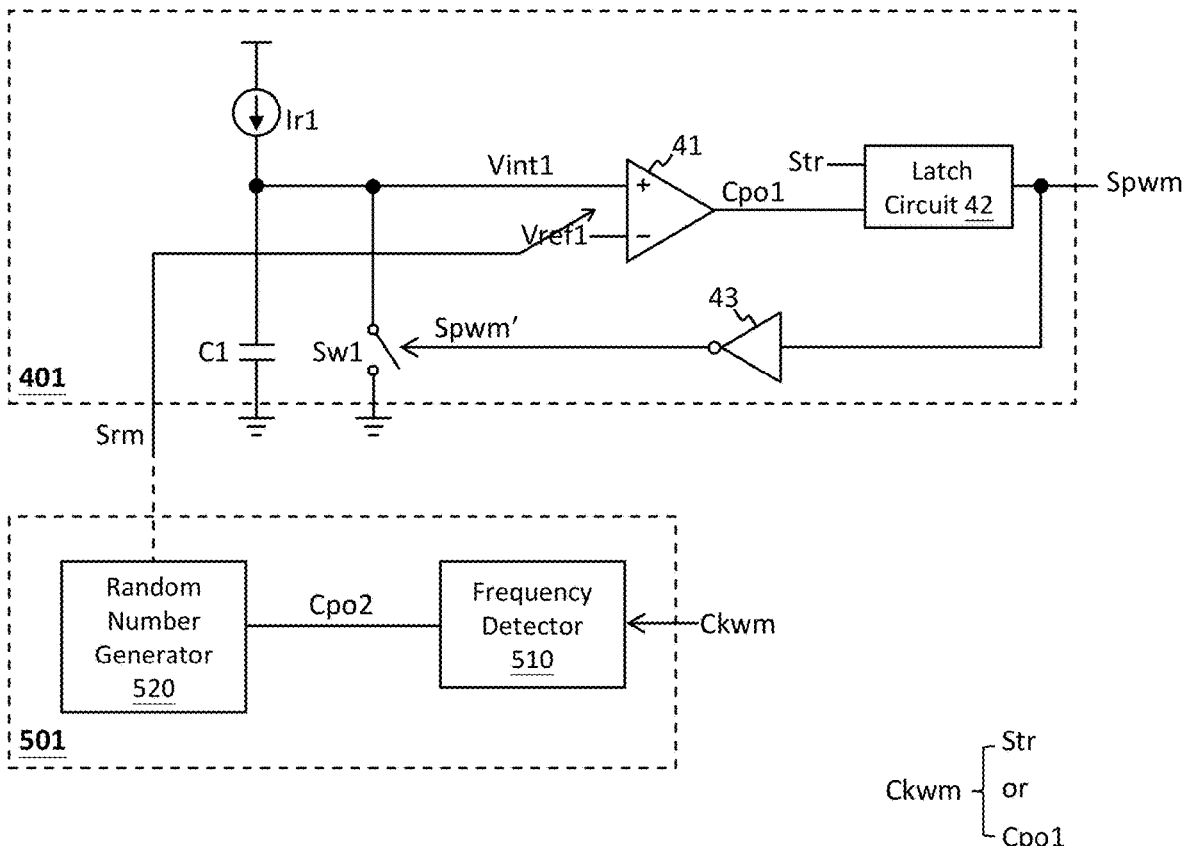
FIG. 7 shows a schematic block diagram of a time calculation circuit and a time adjustment circuit in a switching converter according to another embodiment of the present invention.

Please refer to FIG. 6 along with FIG. 7. FIG. 6 shows a schematic block diagram of a time calculation circuit and a time adjustment circuit in a switching converter according to an embodiment of the present invention, whereas, FIG. 7 shows a schematic block diagram of a time calculation circuit and a time adjustment circuit in a switching converter according to another embodiment of the present invention. The time calculation circuit 401 and the time adjustment circuit 501 shown in FIG. 6 and FIG. 7 are similar to the time calculation circuit 401 and the time adjustment circuit 501 shown in FIG. 4, but have the following differences. As compared to the embodiment shown in FIG. 4, in the embodiment shown in FIG. 6, through adjusting the capacitance of the integration capacitor C1, the time adjustment signal Srm adjusts the time point when the PWM signal Spwm turns to a second state (e.g., low level), and to thereby cause the ON-time or the OFF-time to have a random characteristic or pseudo-random characteristic, whereby the noise is suppressed. As compared to the embodiment shown in FIG. 4, in the embodiment shown in FIG. 7, through adjusting the voltage level of the reference voltage Vref1, the time adjustment signal Srm adjusts the time point when the PWM signal Spwm turns to a second state (e.g., low level), and to thereby cause the ON-time or the OFF-time to have a random characteristic or pseudo-random characteristic, whereby the noise is suppressed. Signal waveforms corresponding to the embodiments shown in FIG. 6 and FIG. 7 are omitted here; they can be derived from the signal waveforms in FIG. 5 by analogy.

Figure 8:
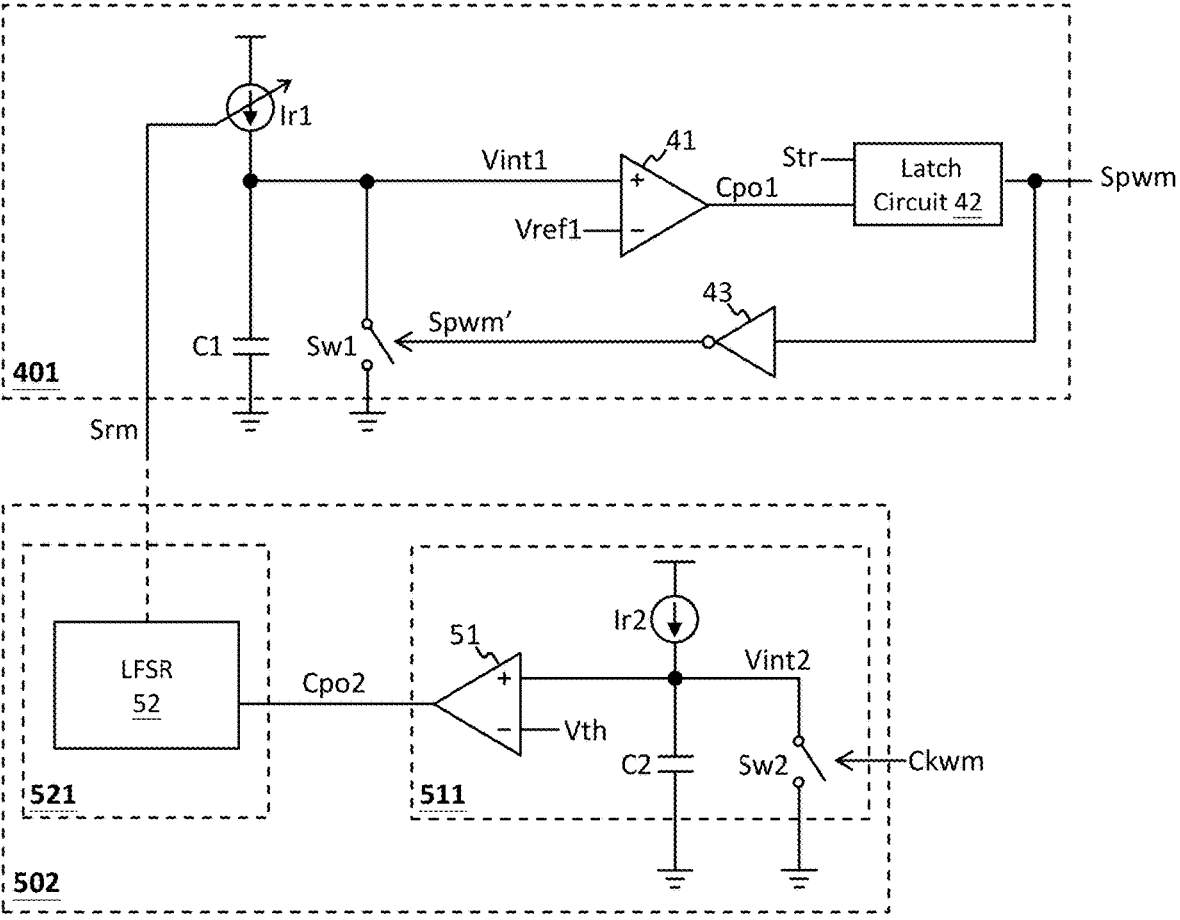
FIG. 8 shows a schematic diagram of a time calculation circuit and a time adjustment circuit in a switching converter according to an embodiment of the present invention.

Please refer to FIG. 8, which shows a schematic diagram of a time calculation circuit and a time adjustment circuit in a switching converter according to an embodiment of the present invention. The time adjustment circuit 502 shown in FIG. 8 is similar to the time adjustment circuit 501 shown in FIG. 4, but has the following differences. As compared to the embodiment shown in FIG. 4, in this embodiment, the frequency detector 511 of the time adjustment circuit 502 in FIG. 8 includes: a comparator 51, a current source Ir2, an integration capacitor C2 and a switch Sw2; and the random number generator 521 of the time adjustment circuit 502 in FIG. 8 includes a linear feedback shift register (LFSR) 52.

In one embodiment, as shown in FIG. 8, the clock signal Ckwm serves to control a conduction state of the switch Sw2, wherein the clock signal Ckwm can be for example the modulation trigger signal Str or the comparison signal Cpo1. Please refer to FIG. 8 along with FIG. 5. In this embodiment, the clock signal Ckwm is the modulation trigger signal Str. At time point to, a pulse of the modulation trigger signal Str turns OFF the switch Sw2. The frequency detector 511 is configured to operably execute an integration operation of the current source Ir2 via the integration capacitor C2, to generate an integration voltage Vint2. At time point t1, a pulse of the modulation trigger signal Str turns ON the switch Sw2, so the integration voltage Vint2 turns to low level. The pulse of the modulation trigger signal Str subsequently turns OFF the switch Sw2, to execute a next integration operation of the current source Ir2. In one embodiment, the comparator 51 serves to compare the integration voltage Vint2 with a voltage threshold Vth. In one embodiment, the voltage threshold Vth corresponds to a predetermined frequency threshold. In a case when the integration voltage Vint2 exceeds (e.g., higher than) the voltage threshold Vth (i.e., as shown by time point t3 in FIG. 5), the comparison signal Cpo2 turns to high level, which indicates that the frequency switching is lower than the predetermined frequency threshold. Consequently, a pulse of the comparison signal Cpo2 triggers a shifting operation of the LFSR 52, to generate the time adjustment signal Srm having a pseudo-random characteristic.

Figure 9:
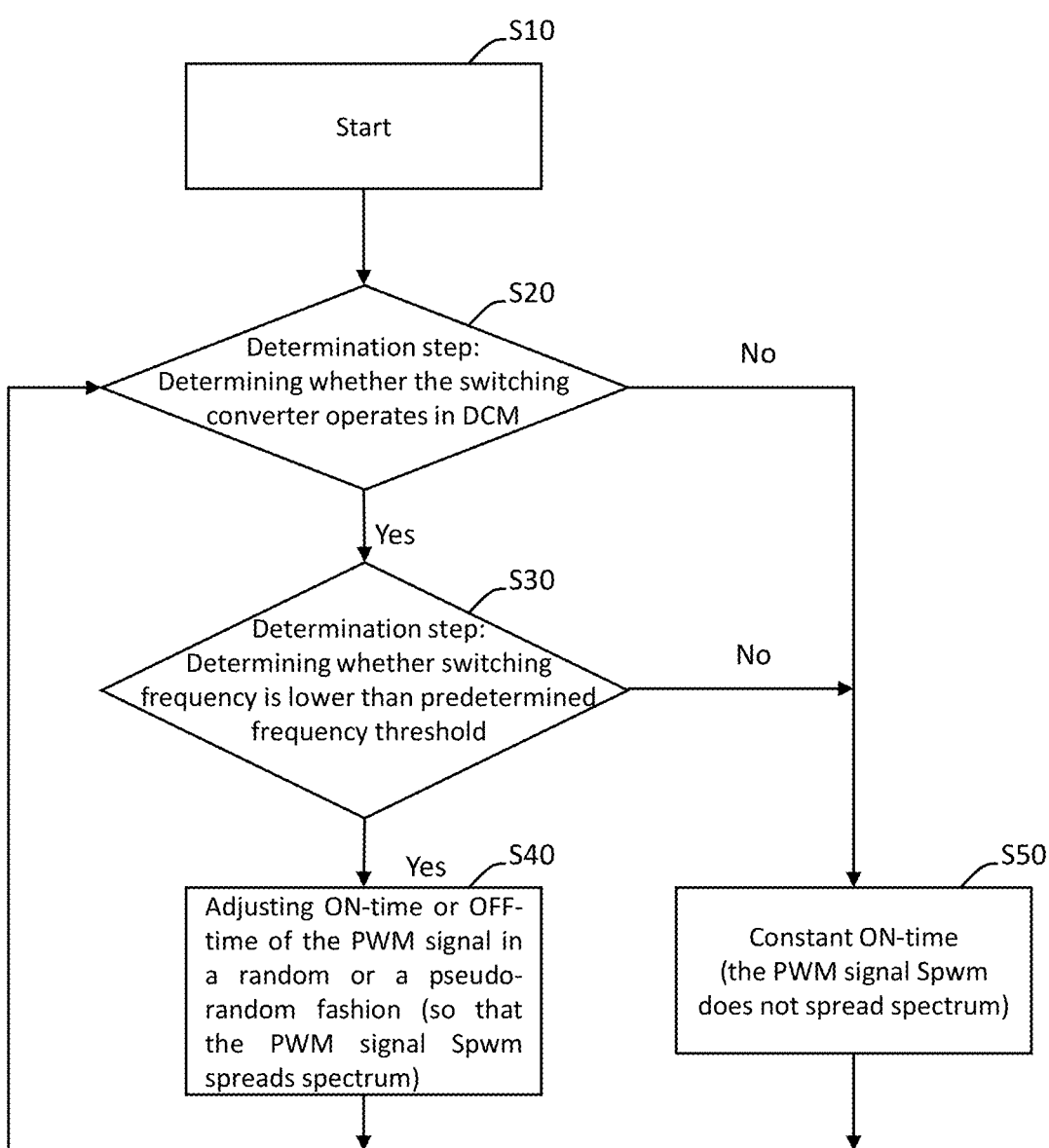
FIG. 9 shows a flow chart diagram depicting operation procedures of a switching converter according to an embodiment of the present invention.

Please refer to FIG. 9, which shows a flow chart diagram depicting operation procedures of a switching converter according to an embodiment of the present invention. In one embodiment, first, the switching converter of the present invention starts operation in step S10. Next, in determination step S20, it is determined whether the switching converter operates in DCM according to the zero current signal Zc. If it is determined in the determination step S20 to be yes, the method proceeds to determination step S30, or otherwise, proceeds to step S50. In one embodiment, the determination step S30 includes: determining whether a switching frequency of the PWM signal Spwm is lower than a predetermined frequency threshold. If it is determined in the determination step S30 to be yes, the method proceeds to step S40, or otherwise, proceeds to step S50. In one embodiment, the step S40 includes: adjusting an ON-time or an OFF-time of the PWM signal Spwm via a time adjustment signal Srm in a random or a pseudo-random fashion, so that the PWM signal Spwm has a spread spectrum characteristic, to thereby suppress a noise resulting from a switching frequency of the PWM signal Spwm. Next, the method proceeds back to the determination step S20, to repeat the aforementioned steps. In one embodiment, in step S50, because the time adjustment signal Srm does not adjust the ON-time or the OFF-time of the PWM signal Spwm, the PWM signal Spwm does not present a spread spectrum characteristic. Next, the method proceeds back to the determination step S20, to repeat the aforementioned steps.

Figure 10:
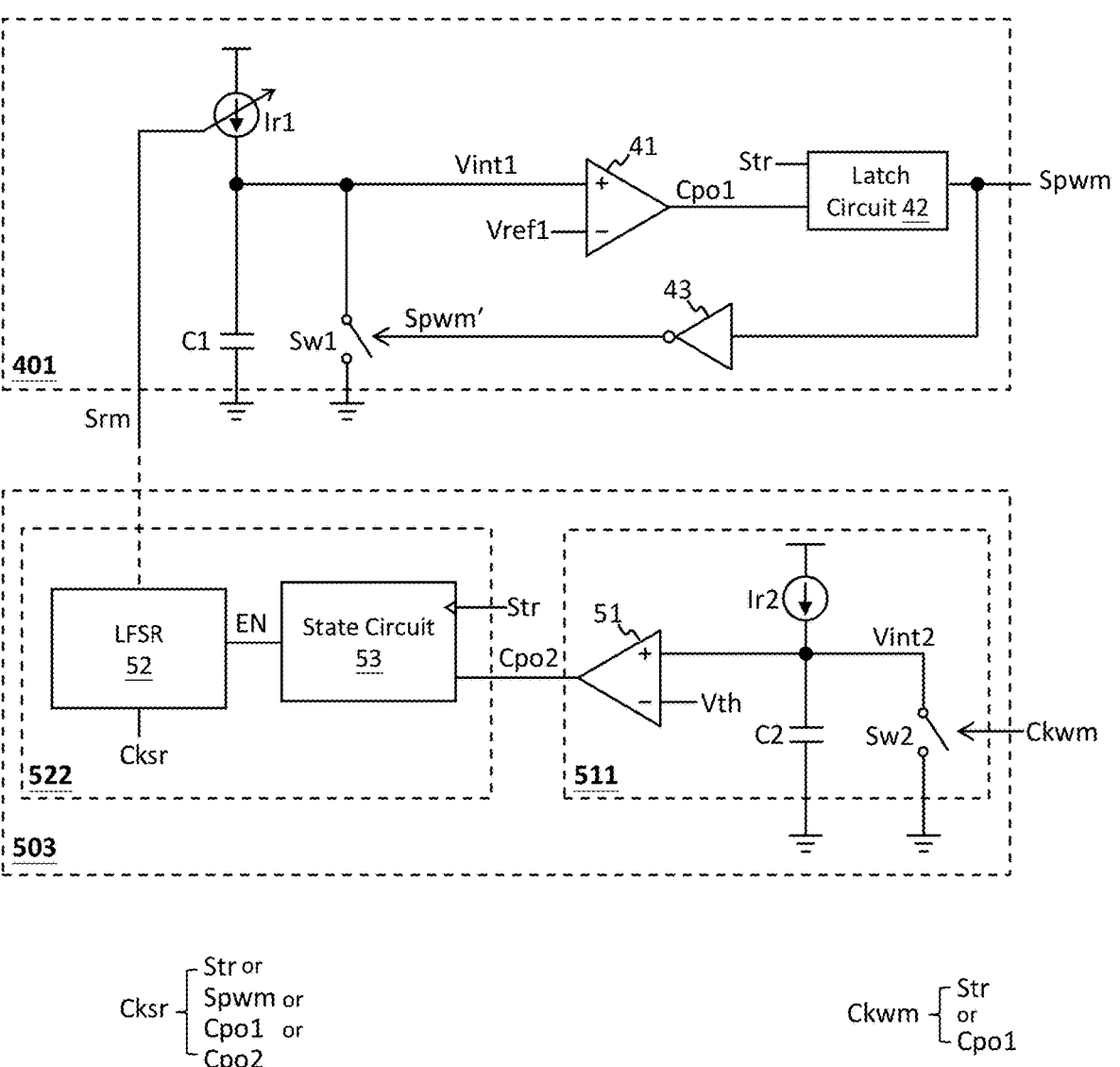
FIG. 10 shows a schematic diagram of a time calculation circuit and a time adjustment circuit in a switching converter according to an embodiment of the present invention.

Please refer to FIG. 10, which shows a schematic diagram of a time calculation circuit and a time adjustment circuit in a switching converter according to an embodiment of the present invention. The time adjustment circuit 503 shown in FIG. 10 is similar to the time adjustment circuit 502 shown in FIG. 8, but has the following differences. As compared to the embodiment shown in FIG. 8, in this embodiment, the random number generator 522 of the time adjustment circuit 503 in FIG. 10 further includes: a state circuit 53. In one embodiment, the state circuit 53 is configured to operably generate an enable signal EN according to the modulation trigger signal Str and the comparison signal Cpo2. The LFSR 52 is configured to operably generate the time adjustment signal Srm having a pseudo-random characteristic according to the enable signal EN and a clock signal Cksr. In one embodiment, the clock signal Cksr can be for example the modulation trigger signal Str, the PWM signal Spwm, the comparison signal Cpo1 or the comparison signal Cpo2.

Figure 11:
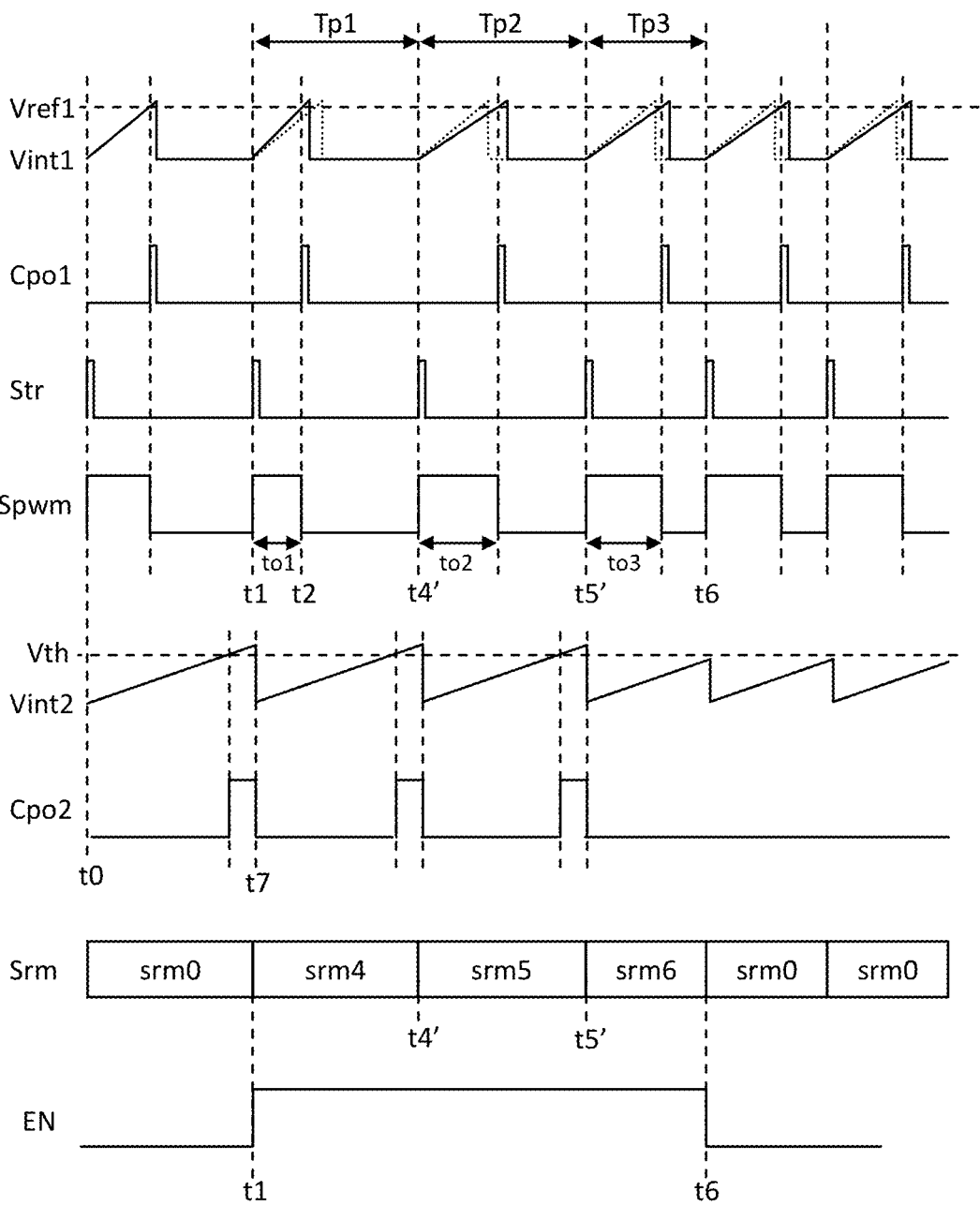
FIG. 11 illustrates a signal waveform diagram depicting the operation of a switching converter of FIG. 10 according to an embodiment of the present invention.

Please refer to FIG. 10 in conjunction with FIG. 11. FIG. 11 illustrates a signal waveform diagram depicting the operation of a switching converter of FIG. 10 according to an embodiment of the present invention. In this embodiment, the aforementioned clock signal Cksr is the modulation trigger signal Str. In the embodiment shown in FIG. 11, the first waveform to the sixth waveform are the same as the first waveform to the sixth waveform shown in FIG. 5; for the behavior of these waveforms, please refer to the pertinent descriptions of the embodiment shown in FIG. 5. In one embodiment, the state circuit 53 of FIG. 10 can be implemented as for example a D flip-flop. Each pulse of the modulation trigger signal Str triggers the state circuit 53 to output a corresponding enable signal EN having a same level as the comparison signal Cpo2. To be more specific, in one embodiment, as shown in FIG. 11, when a pulse of the modulation trigger signal Str turns to high level at time point t1, because the comparison signal Cpo2 is at high level at time point t1, the enable signal EN turns to high level at time point t1 (i.e., "to output a corresponding enable signal EN having a same level as the comparison signal Cpo2" as aforementioned). Subsequently, at time point t4' and at time point t5', because the comparison signal Cpo2 is at high level at these time points when the pulses of the modulation trigger signal Str occur, the enable signal EN will remain at high level. Subsequently at time point t6, because the comparison signal Cpo2 is at low level at this time point, when a pulse of the corresponding modulation trigger signal Str occurs, the enable signal EN turns to low level at time point t6.

Please still refer to FIG. 10 in conjunction with FIG. 11. In one embodiment, during a disable period (i.e., low level period) of the enable signal EN, the LFSR 52 sets the time adjustment signal Srm as a predetermined random number srm0; during an enable period (i.e., high level period) of the enable signal EN, the LFSR 52 updates the random number when triggered by the clock signal Cksr (which is the modulation trigger signal Str in this embodiment). Thus, the generated time adjustment signal Srm has a pseudo-random characteristic. In one embodiment, as shown in FIG. 11, during the enable period of the enable signal EN (i.e., from time point t1 to time point t6), the modulation trigger signal Str triggers the LFSR 52 at time point t1, time point t4' and time point t5', to update the time adjustment signal Srm to be a random number srm4, a random number srm5 and a random number srm6 respectively. On the other hand, during the disable period of the enable signal EN (i.e., prior to time point t1 or after time point t6), the time adjustment signal Srm is set as the predetermined random number srm0.

Figure 12:
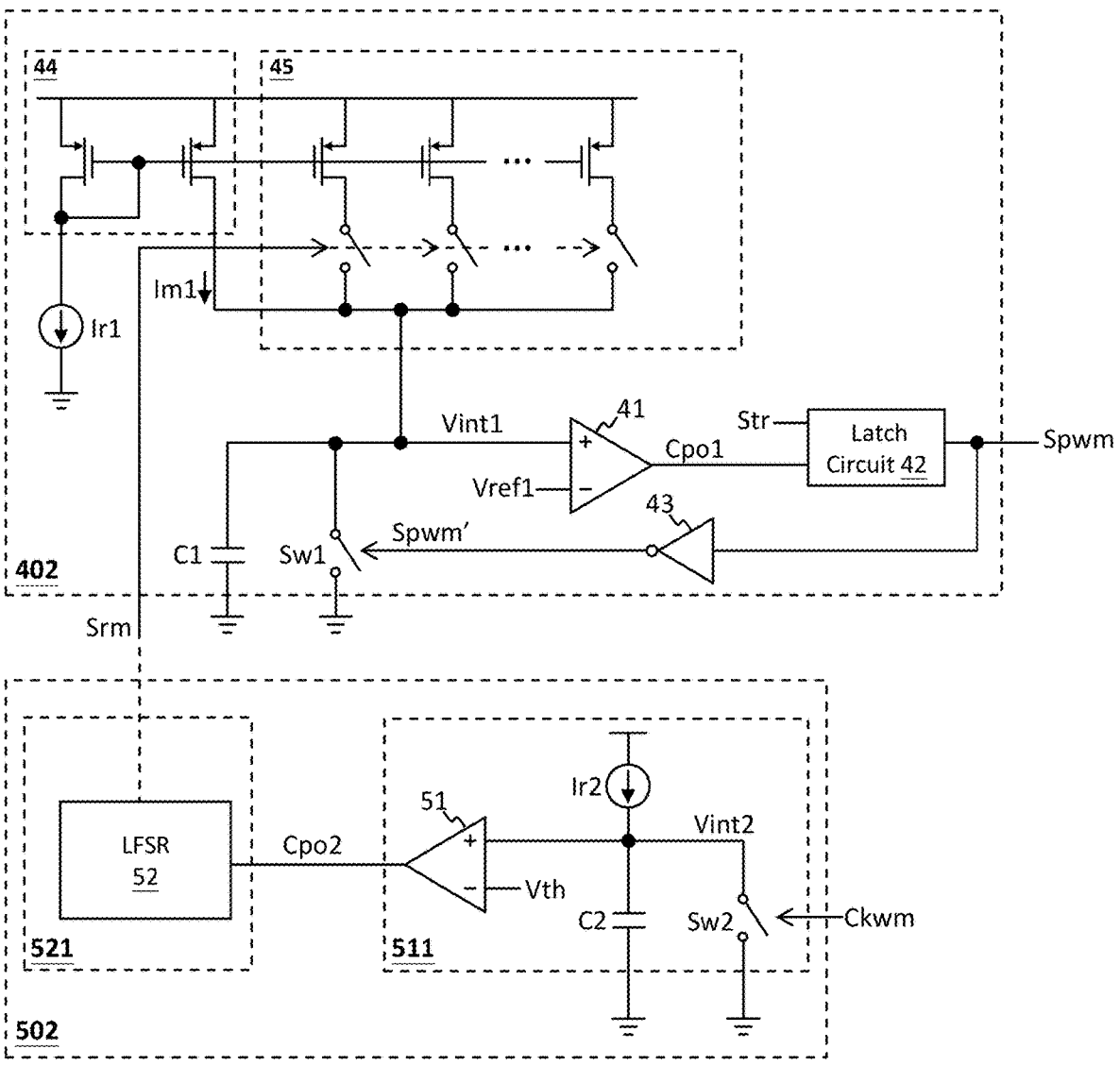
FIG. 12 shows a schematic diagram of a time calculation circuit and a time adjustment circuit in a switching converter according to a specific embodiment of the present invention.

Please refer to FIG. 12, which shows a schematic diagram of a time calculation circuit and a time adjustment circuit in a switching converter according to a specific embodiment of the present invention. The time calculation circuit 402 shown in FIG. 12 is similar to the time calculation circuit 401 shown in FIG. 8, but has the following differences. As compared to the embodiment shown in FIG. 8, in this embodiment, the time calculation circuit 402 shown in FIG. 12 further includes: a current mirror circuit 44 and a current adjustment circuit 45. In one specific embodiment, the current mirror circuit 44 is configured to operably mirror a current source Ir1, to generate a mirror current Im1, whereas, the current adjustment circuit 45 includes transistors and switches. In this embodiment, the time adjustment signal Srm is configured to operably control conduction states of the switches of the adjustment circuit 45 in a pseudo-random fashion, so as to adjust the mirror current Im1, thus adjusting the ON-time or the OFF-time of the PWM signal Spwm, so that the PWM signal Spwm has a spread spectrum characteristic, to thereby suppress a noise resulting from a switching frequency of the PWM signal Spwm.

Figure 13:
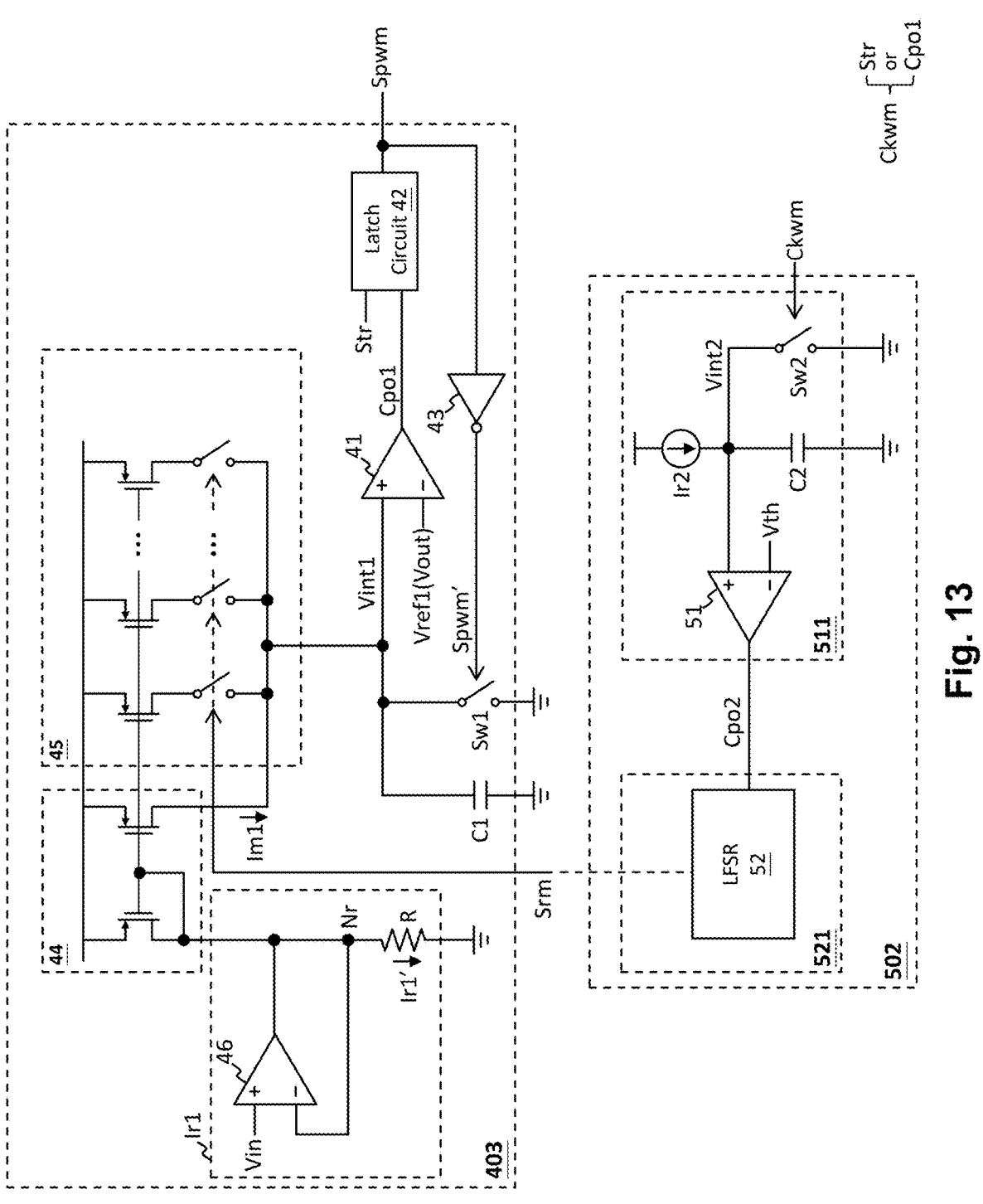
FIG. 13 shows a schematic diagram of a time calculation circuit and a time adjustment circuit in a switching converter according to a specific embodiment of the present invention.

Please refer to FIG. 13, which shows a schematic diagram of a time calculation circuit and a time adjustment circuit in a switching converter according to a specific embodiment of the present invention. The time calculation circuit 403 shown in FIG. 13 is similar to the time calculation circuit 402 shown in FIG. 12, but has the following differences. As compared to the embodiment shown in FIG. 12, in this embodiment, in the time calculation circuit 403 shown in FIG. 13, the current source Ir1 includes: an error amplifier 46 and a resistor R, configured to generate a current Ir1'. In one specific embodiment, the resistor R has one end Nr coupled to a mirror circuit 44. The reference signal of the error amplifier 46 is the input power Vin. The negative input end and the output end of the error amplifier 46 are both coupled to the end Nr of the resistor R, thereby generating the current Ir1' flowing through the resistor R. In one embodiment, the reference voltage Vref1 of a comparator 41 is correlated with the output power Vout. In this embodiment, a current level of the current Ir1' is proportional to a voltage level of the input power Vin, whereas, the voltage level of the reference voltage Vref1 is proportional to the output power Vout, so that when the switching converter operates in a continuous conduction mode (CCM), the switching frequency is kept as a constant. It is worthwhile mentioning that, although it is preferred for the actual switching frequency to be equal to the constant switching frequency, due to non-idealities caused by for example imperfection of components in the circuits or imperfect matching among components in the circuits, the actual switching frequency may not be exactly equal to the constant switching frequency, but with a certain tolerable variation. In other words, according to the present invention, a certain level of error between the actual switching frequency and the constant switching frequency is acceptable and should be regarded as falling in the scope of the present invention.

Figure 14A:
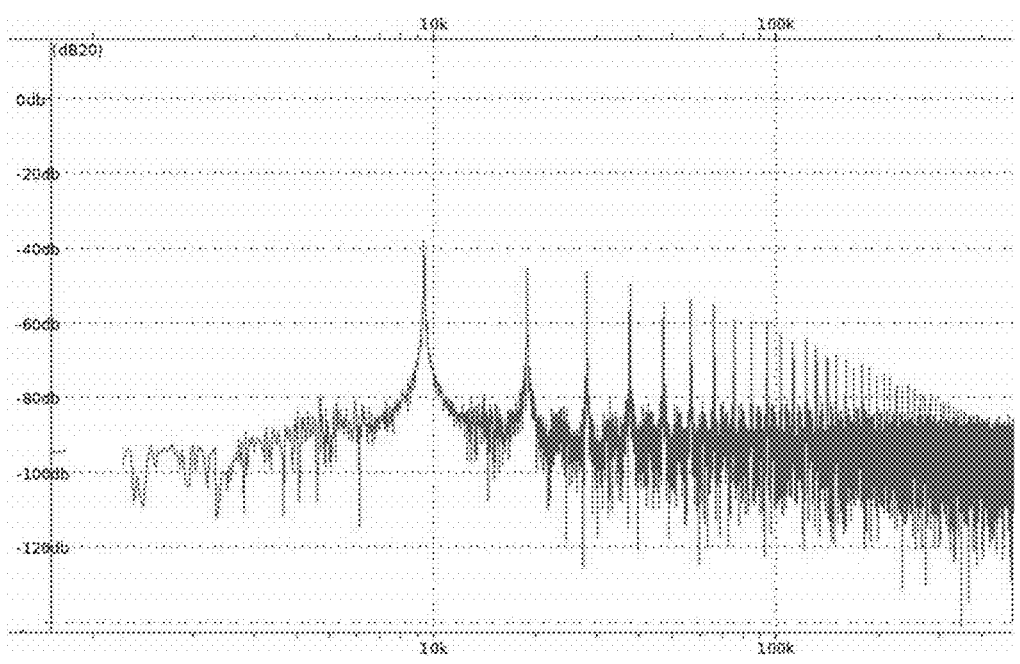
FIG. 14A shows a frequency spectrum diagram of a PWM signal, wherein the PWM signal is not converted by a switching converter having audible noise suppression function according to the present invention.
Figure 14B:
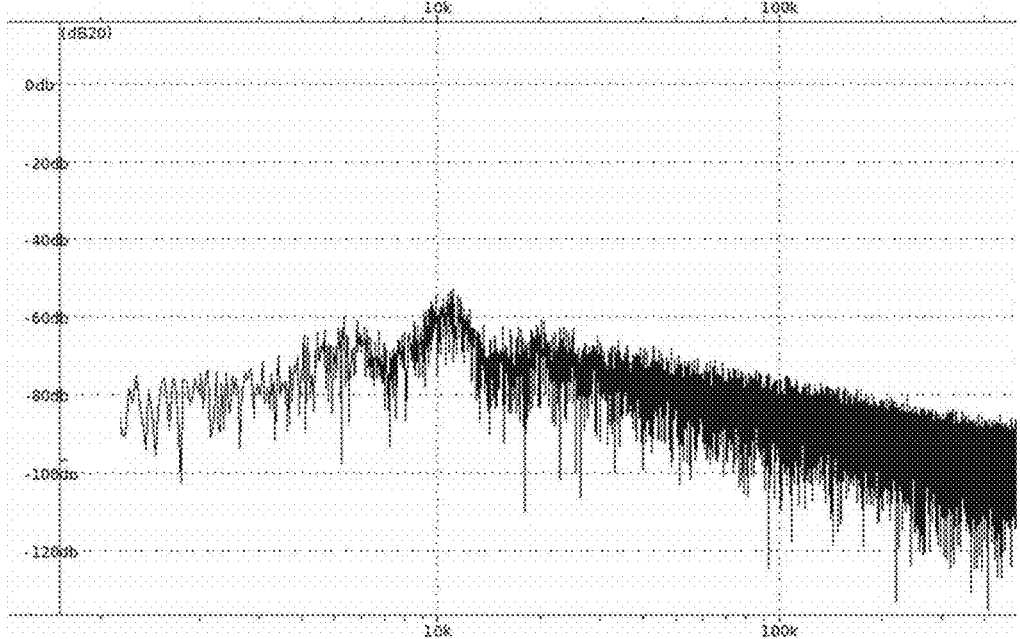
FIG. 14B shows a frequency spectrum diagram of a PWM signal, wherein the PWM signal has been converted by a switching converter having audible noise suppression function according to the present invention.

Please refer to FIG. 14A and FIG. 14B. FIG. 14A shows a frequency spectrum diagram of a PWM signal, wherein the PWM signal is not converted by a switching converter having audible noise suppression function according to the present invention. FIG. 14B shows a frequency spectrum diagram of a PWM signal, wherein the PWM signal has been converted by a switching converter having audible noise suppression function according to the present invention. As shown in FIG. 14A, the PWM signal has a high amplitude at the switching frequency of, e.g., 10 kHz and also has high amplitudes at its higher order resonant frequencies, and undesirable audible noise is generated at frequencies lower than a predetermined frequency threshold (such as 20 kHz). As compared to FIG. 14A, the waveform shown in FIG. 14B has a significant frequency spread spectrum behavior, so the switching converter of the present invention is capable of effectively suppressing the undesirable audible noise.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching converter, which is configured to operably convert an input power to an output power; the switching converter comprising:

a power stage circuit including at least one switch, wherein the power stage circuit is configured to operably switch an inductor, to generate the output power;

a modulation circuit, which is configured to operably execute a pulse width modulation according to a feedback signal related to the output power and a reference signal, to generate a modulation trigger signal;

a time calculation circuit, which is configured to operably generate a pulse width modulation (PWM) signal according to the modulation trigger signal, and which is configured to operably calculate an ON-time or an OFF-time of the PWM signal, wherein the at least one switch is controlled to switch according to the PWM signal and according to a zero current signal generated by a zero current detector that detects a current related to the output power; and a time adjustment circuit, which is configured to operably generate a time adjustment signal according to a first clock signal related to the PWM signal, wherein when the switching converter operates in a discontinuous conduction mode (DCM) and a switching frequency of the PWM signal is lower than a predetermined frequency threshold, the time adjustment signal is configured to operably adjust the ON-time or the OFF-time in a random or a pseudo-random fashion;

wherein when the switching converter operates in a continuous conduction mode (CCM), the switching frequency is kept as a constant.

2. The switching converter of claim 1, wherein the ON-time or the OFF-time, adjusted by the time adjustment signal, has a random characteristic or pseudo-random characteristic, such that the PWM signal has a spread spectrum characteristic.

3. The switching converter of claim 2, wherein the predetermined frequency threshold is smaller than or equal to 30 kHz and greater than or equal to 20 kHz.

4. The switching converter of claim 2, wherein the modulation trigger signal is configured to operably trigger the PWM signal to turn to a first state, wherein when the PWM signal is in the first state, the time calculation circuit is configured to operably execute an integration operation of a first current source via an integration capacitor, to generate a first integration voltage, and the time calculation circuit is configured to operably compare the first integration voltage with a reference voltage, to generate a first comparison signal, wherein when the first comparison signal indicates that the first integration voltage exceeds the reference voltage, the PWM signal turns to a second state.

5. The switching converter of claim 4, wherein the time adjustment signal is configured to operably adjust the first current source, a capacitance of the integration capacitor or a voltage level of the reference voltage in a random or a pseudo-random fashion, so as to adjust the ON-time or the OFF-time.

6. The switching converter of claim 5, wherein the first current source is proportional to the input power, whereas, the reference voltage is proportional to the output power, so that when the switching converter operates in a continuous conduction mode (CCM), the switching frequency is kept as a constant.

7. The switching converter of claim 4, wherein the time adjustment circuit includes:

a frequency detector, which is configured to operably generate a second comparison signal according to the first clock signal, wherein the second comparison signal indicates whether the switching frequency is lower than the predetermined frequency threshold during each switching period, wherein the switching period is a reciprocal of the switching frequency; and a random number generator, which is configured to operably generate the time adjustment signal having a random characteristic or a pseudo-random characteristic according to the second comparison signal, to correspondingly adjust the ON-time or the OFF-time.

8. The switching converter of claim 7, wherein the random number generator includes a linear feedback shift register (LFSR), wherein a pulse of the second comparison signal triggers a shifting operation of the LFSR, to generate the time adjustment signal having the pseudo-random characteristic.

9. The switching converter of claim 7, wherein the random number generator includes:

a state circuit, which is configured to operably generate an enable signal according to the second comparison signal and the modulation trigger signal; and a linear feedback shift register, which is configured to operably generate the time adjustment signal having the pseudo-random characteristic according to the enable signal and a second clock signal, wherein the second clock signal is correlated with the modulation trigger signal, the first comparison signal, the PWM signal or the second comparison signal.

10. The switching converter of claim 7, wherein the frequency detector is configured to operably execute an integration operation of a second current source via the first clock signal, to generate a second integration voltage, wherein when the second integration voltage exceeds a voltage threshold, the second comparison signal indicates that the switching frequency is lower than the predetermined frequency threshold.

11. The switching converter of claim 1, wherein the modulation circuit includes:

an error amplifier, which is configured to operably generate an error amplification signal according to the feedback signal and the reference signal; and a PWM comparator, which is configured to operably compare a ramp signal with the error amplification signal, to generate the modulation trigger signal;

wherein the ramp signal is generated according to an output current of the output power.

12. A conversion control circuit for use in a switching converter, wherein the switching converter includes at least one switch which is configured to operably switch an inductor, to convert an input power to an output power; the conversion control circuit comprising:

a modulation circuit, which is configured to operably execute a pulse width modulation according to a feedback signal related to the output power and a reference signal, to generate a modulation trigger signal;

a time calculation circuit, which is configured to operably generate a pulse width modulation (PWM) signal according to the modulation trigger signal, and which is configured to operably calculate an ON-time or an OFF-time of the PWM signal, wherein the at least one switch is controlled to switch according to the PWM signal and according to a zero current signal generated by a zero current detector that detects a current related to the output power; and a time adjustment circuit, which is configured to operably generate a time adjustment signal according to a first clock signal related to the PWM signal, wherein when the switching converter operates in a discontinuous conduction mode (DCM) and a switching frequency of the PWM signal is lower than a predetermined frequency threshold, the time adjustment signal is configured to operably adjust the ON-time or the OFF-time in a random or a pseudo-random fashion;

wherein when the switching converter operates in a continuous conduction mode (CCM), the switching frequency is kept as a constant.

13. The conversion control circuit of claim 12, wherein the ON-time or the OFF-time, adjusted by the time adjustment signal, has a random characteristic or pseudo-random characteristic, such that the PWM signal has a spread spectrum characteristic.

14. The conversion control circuit of claim 13, wherein the predetermined frequency threshold is smaller than or equal to 30 kHz and greater than or equal to 20 kHz.

15. The conversion control circuit of claim 13, wherein the modulation trigger signal is configured to operably trigger the PWM signal to turn to a first state, wherein when the PWM signal is in the first state, the time calculation circuit is configured to operably execute an integration operation of a first current source via an integration capacitor, to generate a first integration voltage, and the time calculation circuit is configured to operably compare the first integration voltage with a reference voltage, to generate a first comparison signal, wherein when the first comparison signal indicates that the first integration voltage exceeds the reference voltage, the PWM signal turns to a second state.

16. The conversion control circuit of claim 15, wherein the time adjustment signal is configured to operably adjust the first source, current a capacitance of the integration capacitor or a voltage level of the reference voltage in a random or a pseudo-random fashion, so as to adjust the ON-time or the OFF-time.

17. The conversion control circuit of claim 16, wherein the first current source is proportional to the input power, whereas, the reference voltage is proportional to the output power, so that when the switching converter operates in a continuous conduction mode (CCM), the switching frequency is kept as a constant.

18. The conversion control circuit of claim 15, wherein the time adjustment circuit includes:

a frequency detector, which is configured to operably generate a second comparison signal according to the first clock signal, wherein the second comparison signal indicates whether the switching frequency is lower than the predetermined frequency threshold during each switching period, wherein the switching period is a reciprocal of the switching frequency; and a random number generator, which is configured to operably generate the time adjustment signal having a random characteristic or a pseudo-random characteristic according to the second comparison signal, to correspondingly adjust the ON-time or the OFF-time.

19. The conversion control circuit of claim 18, wherein the random number generator includes a linear feedback shift register (LFSR), wherein a pulse of the second comparison signal triggers a shifting operation of the LFSR, to generate the time adjustment signal having the pseudo-random characteristic.

20. The conversion control circuit of claim 18, wherein the random number generator includes:

a state circuit, which is configured to operably generate an enable signal according to the second comparison signal and the modulation trigger signal; and a linear feedback shift register, which is configured to operably generate the time adjustment signal having the pseudo-random characteristic according to the enable signal and a second clock signal, wherein the second clock signal is correlated with the modulation trigger signal, the first comparison signal, the PWM signal or the second comparison signal.

21. The conversion control circuit of claim 18, wherein the frequency detector is configured to operably execute an integration operation of a second current source according to a control by the first clock signal, to generate a second integration voltage, wherein when the second integration voltage exceeds a voltage threshold, the second comparison signal indicates that the switching frequency is lower than the predetermined frequency threshold.

22. The conversion control circuit of claim 12, wherein the modulation circuit includes:

an error amplifier, which is configured to operably generate an error amplification signal according to the feedback signal and the reference signal; and a PWM comparator, which is configured to operably compare a ramp signal with the error amplification signal, to generate the modulation trigger signal;

wherein the ramp signal is generated according to an output current of the output power.

23. A control method configured to control a switching converter, wherein the switching converter includes at least one switch, which is configured to operably switch an inductor, to convert an input power to an output power; the control method comprising following steps:

executing a pulse width modulation according to a feedback signal related to the output power and a reference signal, to generate a modulation trigger signal;

generating a pulse width modulation (PWM) signal according to the modulation trigger signal, and calculating an ON-time or an OFF-time of the PWM signal, wherein the at least one switch is controlled to switch according to the PWM signal and according to a zero current signal related to a current of the output power; and generating a time adjustment signal according to a first clock signal related to the PWM signal, wherein when the switching converter operates in a discontinuous conduction mode (DCM) and a switching frequency of the PWM signal is lower than a predetermined frequency threshold, the time adjustment signal is configured to operably adjust the ON-time or OFF-time in a random or a pseudo-random fashion;

wherein when the switching converter operates in a continuous conduction mode (CCM), the switching frequency is kept as a constant.

24. The control method of claim 23, wherein the ON-time or the OFF-time, adjusted by the time adjustment signal, has a random characteristic or pseudo-random characteristic, such that the PWM signal has a spread spectrum characteristic.

25. The control method of claim 24, wherein the predetermined frequency threshold is smaller than or equal to 30 kHz and greater than or equal to 20 kHz.

26. The control method of claim 24, wherein the modulation trigger signal is configured to operably trigger the PWM signal to turn to a first state, and wherein the control method further comprises: when the PWM signal is in the first state, executing an integration operation of a first current source by an integration capacitor to generate a first integration voltage, and comparing the first integration voltage with a reference voltage to generate a first comparison signal, wherein when the first comparison signal indicates that the first integration voltage exceeds the reference voltage, the PWM signal turns to a second state;

wherein the time adjustment signal adjusts the first current source, a capacitance of the integration capacitor or a voltage level of the reference voltage in a random or a pseudo-random fashion, so as to adjust the ON-time or the OFF-time.

27. The control method of claim 26, wherein the first current source is proportional to the input power, and the reference voltage is proportional to the output power, so that when the switching converter operates in a continuous conduction mode (CCM), the switching frequency is kept as a constant.

28. The control method of claim 26, further comprising following steps:

generating a second comparison signal according to the first clock signal, wherein the second comparison signal indicates whether the switching frequency is lower than the predetermined frequency threshold during each switching period, wherein the switching period is a reciprocal of the switching frequency; and generating the time adjustment signal having a random characteristic or a pseudo-random characteristic according to the second comparison signal, to correspondingly adjust the ON-time or the OFF-time.

29. The control method of claim 28, further comprising following steps:

generating an according enable signal to the second comparison signal and the modulation trigger signal; and generating the time adjustment signal having the pseudo-random characteristic according to the enable signal and a second clock signal, wherein the second clock signal is correlated with the modulation trigger signal, the first comparison signal, the PWM signal or the second comparison signal.

30. The control method of claim 28, further comprising:

executing an integration operation of a second current source by a control of the first clock signal to generate a second integration voltage, wherein when the second integration voltage exceeds a voltage threshold, the second comparison signal indicates that the switching frequency is lower than the predetermined frequency threshold.

* * * * *